(12) United States Patent
Kirshenbaum

(10) Patent No.: US 6,763,338 B2
(45) Date of Patent: Jul. 13, 2004

(54) MACHINE DECISIONS BASED ON PREFERENTIAL VOTING TECHNIQUES

(75) Inventor: Evan R. Kirshenbaum, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 333 days.

(21) Appl. No.: 10/116,835

(22) Filed: Apr. 5, 2002

(65) Prior Publication Data

US 2003/0191726 A1 Oct. 9, 2003

(51) Int. Cl.[7] .............................................. G06F 15/18
(52) U.S. Cl. .............................. 706/12; 706/15; 706/13
(58) Field of Search ............................... 706/12, 15, 13

(56) References Cited

U.S. PATENT DOCUMENTS 5,343,554 A * 8/1994 Koza et al. .................. 706/13
5,790,645 A * 8/1998 Fawcett et al. ............. 379/189
5,819,247 A * 10/1998 Freund et al. ................ 706/25

* cited by examiner

Primary Examiner—George B. Davis

(57) ABSTRACT

A method and apparatus for computing an overall or aggregate decision based on intermediate decisions as to which of a set of alternatives best characterize an object. The alternatives are partitioned into at least two series of preferences corresponding to at least two intermediate rankings. Various embodiments may base the intermediate rankings on: a machine learning technique; a decision tree; a belief network; a neural network; a static model; a program; or an evolutionary training method. Based on the preferences, a weak alternative is selected and removed from the series. The selection of the weak alternative may include identifying which alternatives lose pairwise to the other alternatives, are excluded from the first preferences, are included in the last preferences, or have a lowest average preference ranking. The selecting and removing continue until the remaining alternatives are the aggregate decision. Various embodiments may be applied to classification problems, prediction problems or selection problems.

30 Claims, 12 Drawing Sheets

|  | Evaluator No. 1 | Evaluator No. 2 | Evaluator No. 3 | Evaluator No. 4 | Evaluator No. 5 |
|---|---|---|---|---|---|
| 1st Preference | Sushi | Salad | Pizza | Salad | Sushi |
| 2nd Preference | Pizza | Burger | Salad | Burger | Burger |
| 3rd Preference | Burger | Pizza | Lobster | Pizza | Pizza |
| 4th Preference | Salad | Tacos | Sushi | Lobster | Salad |
| 5th Preference | Tacos | Sushi | Burger | Sushi | Lobster |
| Last Preference | Lobster | Lobster | Tacos | Tacos | Tacos |

410

|  | Tacos | Burger | Pizza | Salad | Lobster |
|---|---|---|---|---|---|
| Sushi | 4-1 | 3-2 | 2-3 | 2-3 | 3-2 |
| Tacos |  | 0-5 | 0-5 | 0-5 | 2-3 |
| Burger |  |  | 3-2 | 2-3 | 4-1 |
| Pizza |  |  |  | 3-2 | 5-0 |
| Salad |  |  |  |  | 5-0 |

413

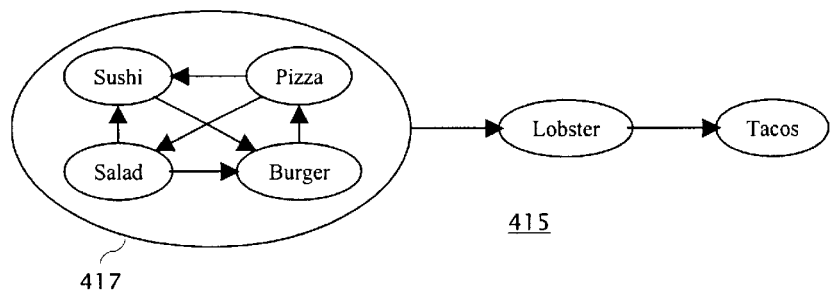

|  | Evaluator No. 1 | Evaluator No. 2 | Evaluator No. 3 | Evaluator No. 4 | Evaluator No. 5 |
|---|---|---|---|---|---|
| 1st Preference | Sushi | Salad | Pizza | Salad | Sushi |
| 2nd Preference | Pizza | Burger | Salad | Burger | Burger |
| 3rd Preference | Burger | Pizza | Sushi | Pizza | Pizza |
| Last Preference | Salad | Sushi | Burger | Sushi | Salad |

420

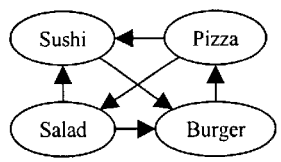

|  | Evaluator No. 1 | Evaluator No. 2 | Evaluator No. 3 | Evaluator No. 4 | Evaluator No. 5 |
|---|---|---|---|---|---|
| 1st Preference | Sushi | Salad | Pizza | Salad | Sushi |
| 2nd Preference | Pizza | Pizza | Salad | Pizza | Pizza |
| Last Preference | Salad | Sushi | Sushi | Sushi | Salad |

430

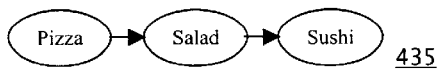

|  | Evaluator No. 1 | Evaluator No. 2 | Evaluator No. 3 | Evaluator No. 4 | Evaluator No. 5 |
|---|---|---|---|---|---|
| 1st Preference | Pizza | Salad | Pizza | Salad | Burger |
| 2nd Preference | Burger | Burger | Salad | Burger | Pizza |
| Last Preference | Salad | Pizza | Burger | Pizza | Salad |

510

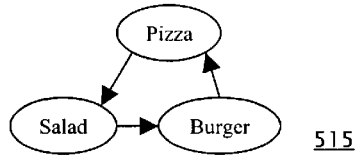

|  | Evaluator No. 1 | Evaluator No. 2 | Evaluator No. 3 | Evaluator No. 4 | Evaluator No. 5 |
|---|---|---|---|---|---|
| 1st Preference | Pizza | Burger | Pizza | Burger | Burger |
| Last Preference | Burger | Pizza | Burger | Pizza | Pizza |

520

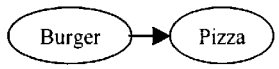

|  | Evaluator No. 1 | Evaluator No. 2 | Evaluator No. 3 | Evaluator No. 4 |
|---|---|---|---|---|
| Weight of Evaluator | 4 | 3 | 2 | 1 |
| 1st Preference | Sushi | Burger | Salad | Pizza |
| 2nd Preference | Lobster | Pizza | Pizza | Sushi |
| 3rd Preference | Burger | Salad | Sushi | Lobster |
| 4th Preference | Pizza | Tacos | Burger | Burger |
| 5th Preference | Salad | Sushi | Lobster | Tacos |
| Last Preference | Tacos | Lobster | Tacos | Salad |

710

|  | Tacos | Burger | Pizza | Salad | Lobster |
|---|---|---|---|---|---|
| Sushi | 7-3 | 7-3 | 4-6 | 5-5 | 10-0 |
| Tacos |  | 0-10 | 0-10 | 1-9 | 3-7 |
| Burger |  |  | 7-3 | 8-2 | 5-5 |
| Pizza |  |  |  | 8-2 | 6-4 |
| Salad |  |  |  |  | 5-5 |

713

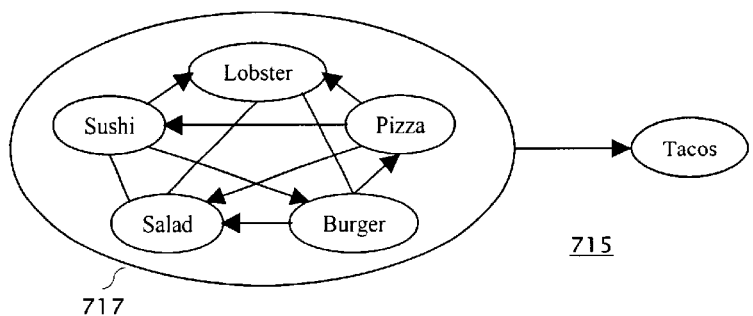

|  | Evaluator No. 1 | Evaluator No. 2 | Evaluator No. 3 | Evaluator No. 4 |
|---|---|---|---|---|
| Weight of Evaluator | 4 | 3 | 2 | 1 |
| 1st Preference | Sushi | Burger | Salad | Pizza |
| 2nd Preference | Lobster | Pizza | Pizza | Sushi |
| 3rd Preference | Burger | Salad | Sushi | Lobster |
| 4th Preference | Pizza | Sushi | Burger | Burger |
| Last Preference | Salad | Lobster | Lobster | Salad |

720

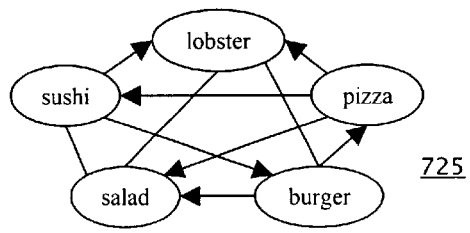

|  | Evaluator No 1 | Evaluator No. 2 | Evaluator No. 3 | Evaluator No. 4 |
|---|---|---|---|---|
| Weight of Evaluator | 4 | 3 | 2 | 1 |
| 1st Preference | Sushi | Burger | Salad | Pizza |
| 2nd Preference | Burger | Pizza | Pizza | Sushi |
| 3rd Preference | Pizza | Salad | Sushi | Burger |
| Last Preference | Salad | Sushi | Burger | Salad |

730

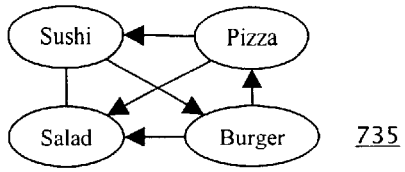

|  | Evaluator No. 1 | Evaluator No. 2 | Evaluator No. 3 | Evaluator No. 4 |
|---|---|---|---|---|
| Weight of Evaluator | 4 | 3 | 2 | 1 |
| 1st Preference | Sushi | Burger | Salad | Sushi |
| 2nd Preference | Burger | Salad | Sushi | Burger |
| Last Preference | Salad | Sushi | Burger | Salad |

740

745

|  | Evaluator No. 1 | Evaluator No. 2 | Evaluator No. 3 | Evaluator No. 4 |
|---|---|---|---|---|
| Weight of Evaluator | 4 | 3 | 2 | 1 |
| 1st Preference | Sushi | Burger | Sushi | Sushi |
| Last Preference | Burger | Sushi | Burger | Burger |

750

755

MACHINE DECISIONS BASED ON PREFERENTIAL VOTING TECHNIQUES

BACKGROUND OF THE INVENTION

1. Field of the Invention

The invention relates generally to decision making and, alternatively, to learning, using a computing machine.

2. Discussion of the Related Art

Modern research and technology have made computing devices commonplace in the lives of many individuals. Many modern devices, appliances and conveniences include various amounts of computing or processing power. Devices that include computing capabilities often make decisions about objects based on whatever input data about the object is available to the device.

Such decisions may include, among others:

Selections of alternatives, help messages or hints about how to use the device, are presented to the user of the device;

Selections of entertainment, advertising, or other options or information to be shown to, or recorded for, the user;

Assessments or evaluations of whoever is using the device or of the environment or context in which the device is being used; or Predictions about a system that the device attempts to model.

Many computing devices include a module or function that classifies objects, models preferences or evaluates alternatives. Such evaluators can decide which one or ones of a set of alternatives best apply to a particular object, as described by the input data available about that object, which may be quite limited.

Some evaluators are based on machine learning, that is, the evaluator has been trained as to what is the correct decision, or is trained over time as the device is actually used. In other cases, evaluators are hand crafted by the programmers who designed the device. In still other cases, experts formulate "rules of thumb" or "operating parameters," which are then entered into a computer program, model or expert system.

There are many known ways of representing or implementing a machine evaluator, including, among others; decision trees, belief networks, neural networks, static mathematical models, expert systems or computer programs. Many of these types of evaluators have known ways of using training data to train new instances of evaluators for new classification, selection or prediction problems. Typically, such training data includes many instances of input data from various example objects, with each instance labeled as to the alternative or alternatives that correctly apply to that object.

An evaluator is usually trained to be applied to objects not seen before. Thus, it is rare that one can speak confidently of having found the best or optimal evaluator. In fact, when the same machine learning model or type of evaluator is run using different batches of training data, different evaluators may be produced.

Further, some machine learning methods are non-deterministic, that is, they are likely to yield a different result each time the model is trained. Such methods include, among others; evolutionary training methods, population based training methods, genetic algorithms or genetic programming. For such methods, the result of the training process is typically not be a single evaluator. Rather, the result may be a number of evaluators, often ranked by some accuracy or fitness measure.

Thus, any particular machine decision problem can be approached using different types of evaluators, or using different instances of evaluators of the same type. One option is to select a single evaluator and use it exclusively. The type of evaluator selected may simply be chosen based on the preferences and familiarity of the person implementing the system.

A second option is to obtain a set of reasonably good evaluators for a particular machine decision problem and combine the result from each evaluator. Given the inaccuracy, uncertainty and other limitations of machine learning and machine decision making, this second approach may be advantageous for many problems.

However, this second option requires combining results from a number of evaluators into making an overall or aggregate decision. One way to combine decisions is to give each evaluator one vote, or a vote weighted by a factor such as the expected accuracy of that evaluator. If one alternative receives a majority of the weighted votes, then the majority should rule. However, there may not be a majority winner.

Another way to combine decisions is pluralistic voting, in which the alternative that receives the most votes is the aggregate decision, regardless of how few votes that alternative receives and regardless of how strong the other alternatives are. However, some observers of the 2000 U.S. presidential election feel there are significant problems with single vote pluralistic voting, especially when the voters are largely split as to their first preference.

Other observers cite the 1970 race for U.S. Senator from New York, in which a liberal Republican and a liberal Democrat split approximately 5 out of 9 votes. This split left conservative James Buckley winning with a plurality of approximately 4 out of 9 votes. To some observers, this result was unfair or inaccurate because a majority of the voters would have preferred either of the liberal candidates to Buckley. That claim could have been proven if the votes had recorded first, second and third preferences from each voter, or if Buckley and the candidate who came in second had faced a run off election.

A related effect occurs when a voter is pragmatically dishonest. A person may cast their vote for the candidate they prefer out of those who they feel have a realistic chance to win, rather than supporting a truly preferred long shot.

Training or designing a computer model to recognize consumer preferences, for example, is complex. It may be undesirable, difficult or infeasible to have such a model somehow adjust the vote it casts by taking into account other likely votes. A way to compute an aggregate decision, based on intermediate decisions as to which alternative or alternatives best apply to an object, has not been known to be available.

SUMMARY OF THE INVENTION

The present invention provides a solution to the problems identified above by providing an automated method and apparatus to employ intermediate decisions as to the application of alternatives to an object to compute an overall or aggregate decision.

According to the invention, at least two intermediate rankings are obtained, each of which ranks each of at least three alternatives with respect to an object. For each intermediate ranking, a corresponding series of preferences is initialized. Each series is ordered from a first preference to a last preference. Each series initially groups each alternative into a preference selected based on the corresponding intermediate ranking. In the case of a tie, each preference may include more than one alternative. Based on all the series of preferences, a weak alternative is selected and removed from each series. Each series is accordingly re-grouped into updated preferences, based on the intermediate ranking corresponding to the series.

When each series contains fewer than a first threshold number of alternatives, then the invention stops and the aggregate decision includes the alternatives remaining in the series. Otherwise, the method repeats the selecting, the removing, the re-grouping and the deciding until an aggregate decision is made.

Various embodiments of the invention include deciding the intermediate rankings based on a technique selected from: a machine learning technique; a decision tree; a belief network; a neural network; a static model; a program; an evolutionary training method; or some other technique. In some embodiments of the invention it may be advantageous to base different evaluators on different techniques.

Some embodiments of the invention can be applied to classification problems.
The alternatives include classifications of the object and the aggregate decision classifies the object.

Other embodiments of the invention can be applied to prediction problems.
The alternatives include a set of future behaviors of the object and the aggregate decision predicts a likely one or more of the future behaviors.

Yet other embodiments of the invention can be applied to selection problems. The alternatives include options and the aggregate decision selects one or more options based on the object.

In some embodiments of the invention, the selection of the weak alternative to be removed includes identifying which alternatives are preferred over other alternatives in pairwise votes or preference contests, and in every series the weak alternative loses to every other alternative. In other embodiments, a generalized criteria is used wherein the weak alternative is selected such that at least a first percentage of the alternatives are preferred over the weak alternative in at least a second percentage of the series.

In yet other embodiments of the invention, the selection of the weak alternative includes identifying which alternatives are included in the first preference (or first several preferences) of every series, and the weak alternative is in the first preference in no more series than any other alternative. In still other embodiments, a generalized criteria is used wherein the weak alternative is selected such that there is less than a selected percentage of the alternatives that are omitted from a set of first preferences more than the weak alternative is omitted from the set of first preferences. The set of first preferences includes one or more of the preference ranks within each series that are most preferred, or equivalently, that have the lowest rank numbers.

In some embodiments of the invention, the thresholds, percentages and sets of references used in the various elimination, selection and termination criteria are independent of each other. Various embodiments of the invention include selecting such thresholds, percentages and preference sets from: a predetermined number; a predetermined percentage of the alternatives; or a number that is adjusted during the operation of the method, among other options.

In other embodiments of the invention, the selection of the weak alternative includes identifying which alternatives are in the last preference (or last several preferences) of every series, and no other alternative is in the last preference in more series than the weak alternative. In other embodiments, a generalized criteria is used wherein the weak alternative is selected such that less than a selected percentage of the alternatives is in a set of last preferences more than the weak alternative is in the set of last preferences. The set of last preferences includes one of more of the preference ranks within each series that are least preferred, or equivalently, that have the highest rank numbers.

In yet other embodiments of the invention, the selection of the weak alternative includes giving to each alternative a number of points based on each preference in each series, the number of points decreasing for lower preferences, and the total points received by the weak alternative is no more than the points received by any other alternative. In still other embodiments, a more general criteria is used wherein the selection of the weak alternative includes calculating an average preference for each alternative, and the average preference of less than a percentage of the alternatives is higher than the average preference of the weak alternative.

In some embodiments of the invention, the selection of the weak alternative includes identifying which alternatives are included in a set of first preferences within each series, and less than a percentage of the series have the weak alternative in the set of first preferences.

Other embodiments of the invention include selecting a particular alternative to be included in the aggregate decision and removing that particular alternative from each series. Some of these embodiments select the particular alternative from: an alternative that is in the first preference of at least a second threshold number of the series; an alternative that is preferred over every other alternative in every series; or an alternative that is preferred over at least a first percentage of the alternatives in at least a second percentage of the series.

The various embodiments of invention may be embodied as a system, a hardware module, a software module, a method, or a media that provides instructions for a programmable device.

BRIEF DESCRIPTION OF THE DRAWING

The drawing illustrates technologies related to the invention, shows example embodiments of the invention, and gives examples of using the invention. The objects, features and advantages of the invention will become more apparent to those skilled in the art from the following detailed description, when read in conjunction with the accompanying drawing, wherein:

FIGS. 4(a), 4(b) and 4(c) show an example of a machine decision problem in which five evaluators rank alternative types of restaurants for a person visiting a web site, and shows how an overall or aggregate decision is reached, according to some embodiments of the invention, as to which restaurant advertisement is most likely to be effective with this person;

FIGS. 5(a) and 5(b) shows how other embodiments of the invention would operate on the same example problem as in FIG. 4;

DETAILED DESCRIPTION OF THE PREFERRED EMBODIMENTS

The descriptions and discussions herein illustrate technologies related to the invention, show examples of the invention and give examples of using the invention. Known methods, procedures, systems, circuits or components may be discussed without giving details, so as to avoid obscuring the principles of the invention. On the other hand, numerous details of specific examples of the invention may be described, even though such details may not apply to other embodiments of the invention. Details are included and omitted so as to better explain the invention and so as to aid in understanding the invention.

The invention is not to be understood as being limited to or defined by what is discussed herein; rather, the invention may be practiced without the specific details described herein. One skilled in the art will realize that numerous modifications, variations, selections among alternatives, changes in form, and improvements can be made without departing from the principles, intention or legal scope of the invention.

Some descriptions herein use abstract or general terms including among others: symbol, number, bit, procedure, step or block. Those skilled in the art use such terms as a convenient nomenclature for data and operations within a computer, digital device or electromechanical system. Such data and operations are represented by physical properties of actual objects including electronic voltage, magnetic field, optical reflectivity or other properties. Similarly, perceptive or mental terms including, among others, detect, sense, recall, present, compare, process, manipulate, analyze, decide or determine, may also refer to such data, such operations or to manipulations of such physical properties.

Figure 1:
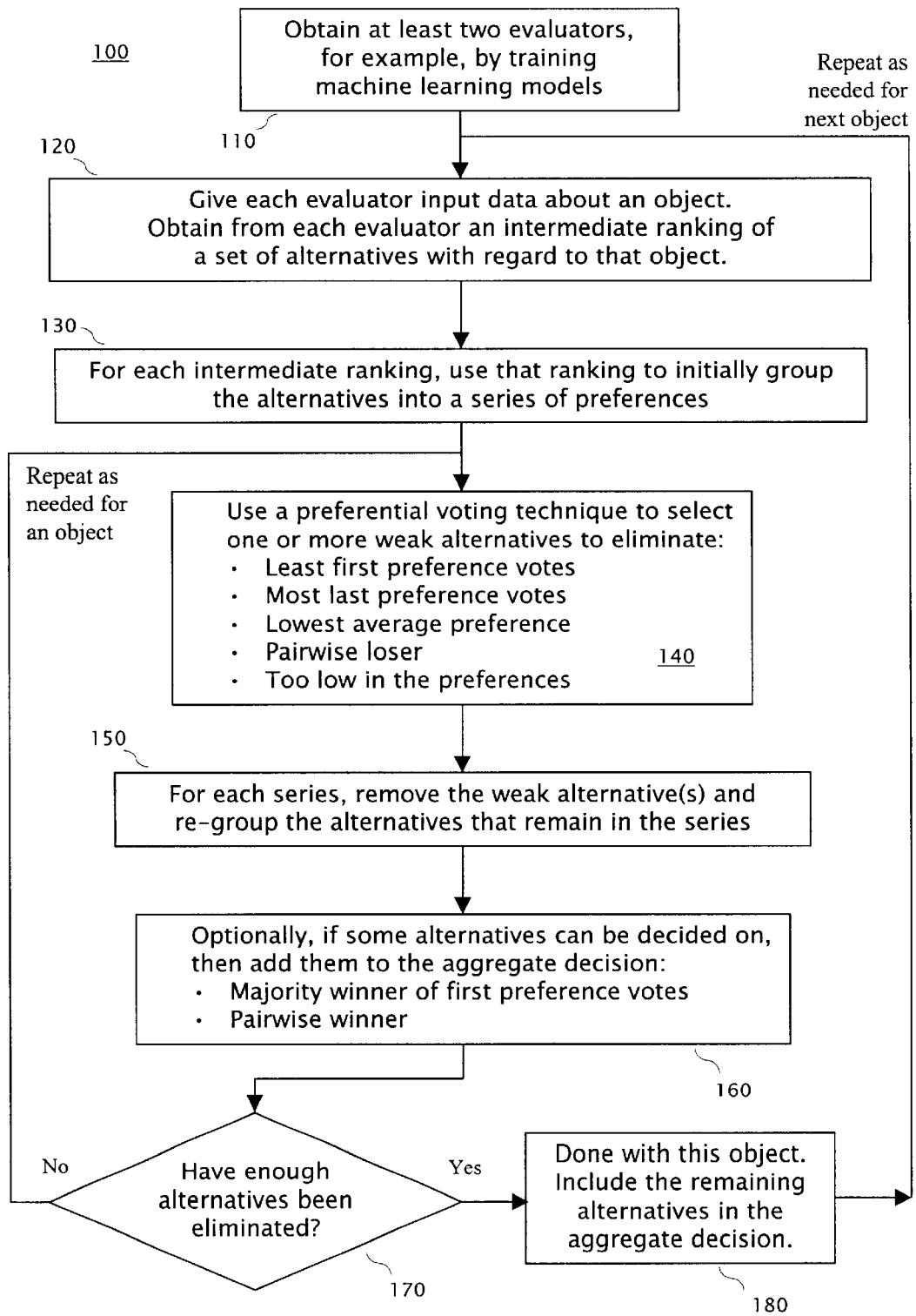
FIG. 1 shows the basic steps used, in some embodiments of the invention, to compute an aggregate decision about an object.

FIG. 1 is a flow chart showing the basic steps used in process 100, according to some embodiments of the invention. Process 100 computes an aggregate decision about an object.

An object may include, among other options: a customer; a document; a web browsing session; a product being manufactured; a person; a place; a thing or a set of information. At least some input data about each instance of the object must be available to the evaluators used. For example, machine decisions about potential customers may be based on their consumer profile as recorded when they register to use the web site, on what web pages they browse within the site, what products they look at within the site or what products they order. Machine decisions about television viewers or households may be based on what cable television shows they select to watch.

An aggregate decision may be one or more alternatives selected from among a set of alternatives. The decision is an attempt to pick the alternatives that best match, apply to, relate to, are relevant for, correspond to or otherwise are appropriate for a particular instance of an object.

An alternative may be a candidate, an attribute, an option, a category, an advertisement, an entertainment selection, a document—or any person, place, thing or information that may somehow meaningfully relate to a particular object. For this invention to be effective, at least three alternatives should be in the set used, and in some embodiments of the invention may support an unlimited number of alternatives. In practical machine decision problems, there may literally be millions of alternatives, for example, which item to advertise to a particular potential customer.

At the start of process 100, the decision problem has already been set up. Specifically, what the objects may be, what data may be available about each object and what alternatives are to be considered have been defined. Various embodiments of the invention may be applied to various types of machine learning or decision problems including, among others: classification; optimal selection; and prediction.

In a classification problem, there are a number (typically a large number) of objects. Often, the input data characterizes each object along some dimensions. The goal of classification is for the evaluator to assign each object to the appropriate one of a set of alternatives, or to place the object into the appropriate "bin." Such alternatives may include, among others:

"Excellent credit risk" or "OK credit risk," versus "bad credit risk," for a potential customer;

"Almost certain sale" or "may buy," versus "just window shopping," for a person browsing a sales oriented web site, perhaps to allocate web server resources so as to give more serious shoppers better response time;

"Bargain hunter," "gadget freak" or "snob," versus "time is money," for the same person to decide what to advertise to them;

"Low end" or "average," versus "high end," for a component being tested or a consumer device;

"Under 12 years old," "13 to 17 years old," "18 to 35 years old," versus "over 35 years old"; or "Interested in jazz," "interested in rock" or "interested in classical," versus "interested in blues."

A selection problem also has a set of alternatives, with the goal being to pick one or more that satisfy some selection criteria, which may include but are not limited to:

"The alternative that the customer is most likely to buy"; or

"The alternative that is likely to generate the most profit," which may be the likelihood of the customer purchasing a particular alternative, multiplied by the profit made if purchased.

For example, an online book seller may have literally millions of titles to sell (that is, alternatives), but room to advertise only a few of them on the web page that the potential customer (that is, the object) is browsing. Based on whatever browsing history or customer profile information is available, a computer implemented selection evaluator can pick which few book titles are advertised on the various web pages that the customer sees.

Such an example evaluator selects from among the many alternatives a limited number that can be advertised conveniently. The goal of this evaluator is to select one or two titles that the customer actually buys. If that goal is met, then such suggestive selling can be successful both at increasing sales and at increasing customer satisfaction. A customer who purchases a suggested book may feel "That was a good idea"—that the online sales process helped meet his research, entertainment or gift buying needs.

In a prediction problem, each alternative represents a possible future behavior of an object and the goal is to pick one or more that is most likely to happen. Typical sets of prediction alternatives may include but are not limited to:

"Sales to increase" versus "sales to be steady" versus "sales to decrease."

"Temperature will get hotter" versus "temperature will be steady" versus "temperature will get cooler."

In step 110 of process 100, at least two evaluators are designed, developed, trained or otherwise obtained. An evaluator may be a machine implemented module, function or routine that can accept input data describing a particular instance of an object and that can rank, based on the input data, each of the set of alternatives. Given the set of alternatives, a set of necessarily more than one evaluator is obtained, each of which is capable of providing an ordered list of the possible alternatives given some input data.

Each evaluator generates an intermediate ranking in step 120. An intermediate ranking may be an ordering of the set of alternatives as to how appropriate each is to a particular object. In some embodiments of the invention, there is no upper limit on the number of evaluators used. For example, evolutionary machine learning techniques may produce thousands of evaluators.

In some embodiments of the invention, an intermediate ranking may include one or more ties, in which two or more alternatives are put into the same order, ranking, group or preference, that is, first preference, second preference and so on down to last preference. Ties may occur because an evaluator cannot distinguish the alternatives, or because an evaluator puts alternatives into the same preference when the difference found between those alternatives is sufficiently small as to be negligible or untrustworthy.

Next, in step 130, at least two series of preferences are initialized, one series corresponding to each evaluator. Each series initially groups every alternative into one of the preferences. For each object, the data available on it is run through each of the evaluators, obtaining a ranking list from each. In some embodiments, the results or intermediate ranking produced by an evaluator may indicate that the evaluator considers two or more alternatives to be equally likely.

In step 140, one or more alternatives are selected as weak alternatives. Weak alternatives are to be eliminated from consideration and will not be included in the aggregate decision.

Figure 7:
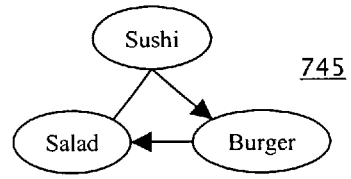
FIGS. 7(a), 7(c), 7(d) and 7(e) show how the same example machine decision problem is handled by another embodiment of the invention, in which four weighted evaluators select the restaurant advertisement, the weights being, for example, the relative accuracy of the evaluators or the confidence of the evaluators.
Figure 7:
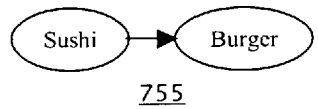

Some embodiments of the invention apply a weighting factor to the intermediate ranking from each evaluator. How such a weighting factor may be applied is discussed below with respect to table 710 of FIG. 7(*a*).

Such weighting factors may be static and reflect the accuracy of that evaluator or other static considerations. Alternatively, such weighting factors may be dynamic or may include a dynamic factor such as, among others, a factor selected by the evaluator itself. Some evaluators merely provide a best guess, that is, they decide on which one or ones of the alternatives are most likely to apply to each object. Other evaluators give a numeric estimate of the confidence they place in the alternatives they decide on. Such evaluators may be able to estimate the probability that the correct alternative is selected. Such a probability estimate may be included in calculating a weighting factor for that intermediate decision.

In some embodiments of the invention, the selection of weak alternatives is based on a preferential voting technique.

Each intermediate decision is considered as a preferential vote, that is, each evaluator is interpreted as saying that the first alternative listed is the one the evaluator is most confident is the correct answer, the second is the one it is next most confident about, and so on, down through the last alternative, which it thinks is least likely to be correct.

Some embodiments of the invention treat the intermediate decision from each evaluator as if it was a vote in an election, with the alternatives being the candidates running in the election. If any alternative gets an absolute majority of votes (i.e. it is in the first place preference of one more than half of the intermediate rankings), then that alternative is chosen as the "winner" of the election, that is, as the aggregate decision. That is the alternative that the overall combined evaluator, according to the invention, assigns to the input data.

If there is no such majority winner, one of the preferential voting rules may be used to identify one alternative (or perhaps more) to remove from consideration. A preferential voting technique is one that is not pluralistic, that is, the alternative that receives more votes than any other alternative but fewer than a majority of the votes cast is not necessarily selected as the winner. Rather, the preferences of the voters other than their first preference are taken into account.

Use of preferential voting techniques requires obtaining more information than merely a first choice from each evaluator. If the evaluators can rank the alternatives from those considered most likely to apply to those considered least likely to apply, then a variety of advantageous voting methods become applicable.

In some embodiments of the invention, if no alternative receives a majority of the first preference votes, either with one vote being given to each evaluator or with each evaluator being given a weighted amount of voting power, then the preferences of the evaluators, other than the first preference, are taken into account in selecting alternatives to eliminate from consideration as the process proceeds in selecting the aggregate winner. Preferential voting techniques may include, among others:

Fewest first preference votes (also known as Hare elimination, an Australian ballot, an instant run off or a single transferable vote), in which those alternatives that receive the fewest first place votes are selected for elimination;

Most last preference votes (also known as Coombs elimination), in which those alternatives that receive the most last place votes are selected for elimination;

Lowest average preference (also known as a Borda count or sport team ranking), in which points are assigned to each preference rank with the more preferred ranks receiving more points and the alternatives that receive the fewest points are selected for elimination;

Pairwise loser (also known as the Condorcet loser), in which it is determined if the rankings are such that a particular alternative would lose by a majority in a pairwise or one-on-one vote against every other alternative—there will not always be such a loser but when there is, that alternative is selected for elimination. For example, James Buckley would have been eliminated from the above mentioned Senate race; or Too low in the preferences, in which a threshold is set such that an alternative that does not appear within the top $N_1$ preferences in at least $N_2$ of the intermediate rankings (for some numbers $N_1$ and $N_2$) is selected for elimination. For example, if the aggregate decision is to include no more than three of the alternatives, then any alternative that receives few or no votes for first, second or third preference can be eliminated.

In some embodiments of the invention, the thresholds (such as $N_1$, among others), percentages and sets of preferences (such as is specified by $N_2$, among others), used in the various elimination, selection and termination criteria are independent of each other. Various embodiments of the invention include selecting such thresholds, percentages and preference sets from: a predetermined number; a predetermined percentage of the alternatives; or a number that is adjusted during the operation of the method among other options.

In step 150, the alternative or alternatives selected for elimination are removed from the preferences in each series. Also, the alternatives that remain in each series are re-grouped into an updated series of preferences. For example, if a particular series had only one alternative as the second preference and that alternative is eliminated, then every preference lower than second moves up by one preference.

In embodiments of the invention that include step 160, the alternatives remaining in the higher preferences are examined for possible winning alternatives. Techniques suitable for identifying a winning alternative may include, among others:

Majority winner, as discussed above with respect to step 140, in which it is determined if there is an alternative that is the first preference within at least one more than half of the series; or Pairwise winner, also known as the Condorcet winner, in which it is determined if the rankings are such that a particular alternative would win the majority vote in a pairwise vote against every other alternative.

In some embodiments of the invention, when there is such a winning alternative, then it becomes the aggregate decision and process 100 terminates. In other embodiments, the aggregate decision is to include more than one alternative. In such embodiments, the winning alternative may be included in the aggregate decision, removed from each series of preferences and process 100 continue to select other alternatives that are also to be included.

Yet other embodiments of the invention include provisions for resolving ties including, but not limited to, ties among winning alternatives. Criteria for breaking ties include, among others: selecting the alternative in the tie that wins pairwise contests against the other alternatives in the tie; selecting the alternative in the tie that loses pairwise contests against the other alternatives in the tie; or comparing the number of second preference votes for each alternative if the tie is based on an equal number of first preference votes.

There are three cases that can arise when winning alternatives tie. In a first case, the number of alternatives that tie as winners is less than the number of alternatives that are still to be included in the aggregate decision. In some embodiments of the invention, all of these winners may be both be added to the aggregate decision and be removed from the series of preferences and process 100 may continue to select more alternatives to include in the aggregate decision.

In a second case, the number of alternatives that tie as winners is equal to the number of alternatives needed to complete the aggregate decision. In other embodiments of the invention, all of these winners may be added to the aggregate decision and process 100 may terminate.

In a third case, the number of alternatives that tie as winners is more than the number of alternatives needed to complete the aggregate decision. In yet other embodiments of the invention, all alternatives other than these winners may be removed from the series of preferences and process 100 may continue so as to eliminate more alternatives.

In some embodiments of the invention, process 100 continues until a sufficient number of winning alternatives have been identified. In other embodiments, process 100 continues until a sufficient number of alternatives have been eliminated from the series of preferences as shown in step 170. According to step 180, the preferences remaining in the series may be, or may be included in, the aggregate decision.

The Condorcet methods are named after the $18^{th}$ Century French election theorist who originated them. These methods may be considered a logical extension of majority rule when more than two choices are involved. Each alternative is compared pairwise against each other alternative by noting the relative positions of the two alternatives on each the intermediate rankings from each evaluator. If there is one alternative that wins every pairwise race, then it is the Condorcet winner and should be chosen. If there is a alternative that loses every pairwise race, it is a Condorcet loser and should be discarded.

In general, from the set of alternatives it is deterministically possible to extract a totally ordered set of groups of alternatives. These groups have the property that no element of a group loses a pairwise race against a member of a group that is later in the ordering. However, depending on how the voting turns out, the alternatives may all fall into a single group, in which case Condorcet methods are not helpful at this time. Condorcet methods may be tried again after another approach is used to prune out some of the alternatives.

In some embodiments of the invention, the first step is to prune the list of alternatives to the most dominant Condorcet group. In other embodiments of the invention, such pruning is applied before or after each pruning operation based on another technique.

The Condorcet winner is the alternative who, when compared in turn with each of the other alternatives, is preferred to them. For example, A beats B if more evaluators have ranked A over B than vice versa. If one alternative beats each one of the others, then it wins. This method can be extended as follows: if no one alternative beats each one of the others, then the winner is the alternative over which fewest voters have ranked any one particular alternative that beats it. In other words, for each alternative, determine which alternative that beats it is ranked over it by the most voters. The number of voters ranking that alternative over it is the measure of how beaten it is. The winner is the alternative least beaten by that measure.

The Condorcet methods are one of several pairwise methods for electing people in single-seat elections (president, governor, mayor, for example). Unlike most methods that make you choose the lesser of two evils, Condorcet's method and other pairwise methods let you rank the alternatives in the order in which you would like to see them elected. The way the votes are tallied is by computing the results of separate pairwise elections between all of the alternatives, and the winner is the one that wins a majority in all of the pairwise elections.

The Condorcet methods let voters mark their sincere wishes for who they would like to win the election, without having to consider strategy ("I'd vote for Alternative B, but I'm afraid of wasting my vote.").

When performing the pairwise votes, the evaluators may be weighted, as in other methods, by confidence, fitness, or a boosting factor. Also, it may be desirable to set some minimal threshold for margin of victory below which a pairwise race is considered a tie, a principle which might have changed the outcome of the 2000 U.S. presidential race.

Some embodiments of the invention optionally check to see if any alternative is a Condorcet winner. A Condorcet winner is one who would beat all of the remaining alternatives in pairwise contests. This may be done by counting up the rankings that list one alternative before the other and taking the one that has sufficiently more. If there is such a Condorcet winner, the combined evaluator assigns that alternative to the input data. Note that there is, in practice, no good reason for doing both of the optional steps. If there is a Condorcet winner, the pruning will cause it to be the only alternative left and so it will have a majority in the next round.

Some embodiments of the invention include a method that combines multiple evaluators in a first voting method, such as the Condorcet method, to prune the alternatives to a dominant group and then use a second voting method to select a winner. Assuming there is more than one alternative remaining after Condorcet pruning, there are several methods for removing them sequentially until only one remains.

In the Hare method, also known as an Australian ballot, a single transferable vote (STV), or an instant run off, the alternative who appears first of those remaining in a majority of voters' rankings is selected as the winner. Originated by Thomas Hare in England and Carl George Andrae in Denmark in the 19$^{th}$ Century, this approach has been adopted throughout the world. It is used to elect public officials in such countries as Australia (where it is called the "alternative vote"); Malta; the Republic of Ireland; Northern Ireland; in local elections in Cambridge, Mass.; in local school board elections in New York City; and in numerous private organizations. In this technique, if a preferential vote does not help select the first preference, then the vote may still be counted to benefit lower preferences.

In some embodiments of the invention that use one of the Hare methods, when no alternative has a majority (which is guaranteed to be the case the first time around if Condorcet pruning has been previously applied), then the alternative with the smallest number of first place votes (of those alternatives not already removed) is removed. Such elimination may be repeated as needed.

Other embodiments apply Condorcet pruning before or after each repetition of another elimination technique, such as Hare. This technique is guaranteed to terminate in a single winner, or at least in a set of alternatives who don't pass the margin of victory threshold with respect to one another.

A similar method is credited to Coombs, who observed that to reduce tension among the people voting, it may be more important to eliminate the least liked alternatives than to select the most liked alternatives. Using this technique is similar to using Hare's, except that the alternative with the largest number of last preference votes (of those alternatives not already removed) is removed.

A different method is called a Borda count or a sports team ranking. Under a system proposed in the 18$^{th}$ Century, points are assigned to preference rankings and totaled for each alternative. In the method as Borda originated it, if there are N alternatives for some number N, then each evaluator's first preference gets N minus 1 points, or perhaps N minus 1 times the relative weighting factor of the evaluator. That evaluator's second choice gets N minus 2 votes, and so on, down to their last choice, which gets no votes. In other words, the lowest ranked alternative of each evaluator receives zero points, the next lowest one point, and so on, up to the highest ranked alternative, who receives N minus 1 votes. Points for each alternative are summed across all evaluators, and the alternative with the most points wins.

The Borda method may be generalized, as it typically is when sports writers or coaches rank teams, and the allocation of points to preferences can be any monotonic distribution. For example, the first preference might get 100 points, the second 50, the third 25, and so on.

Figure 2:
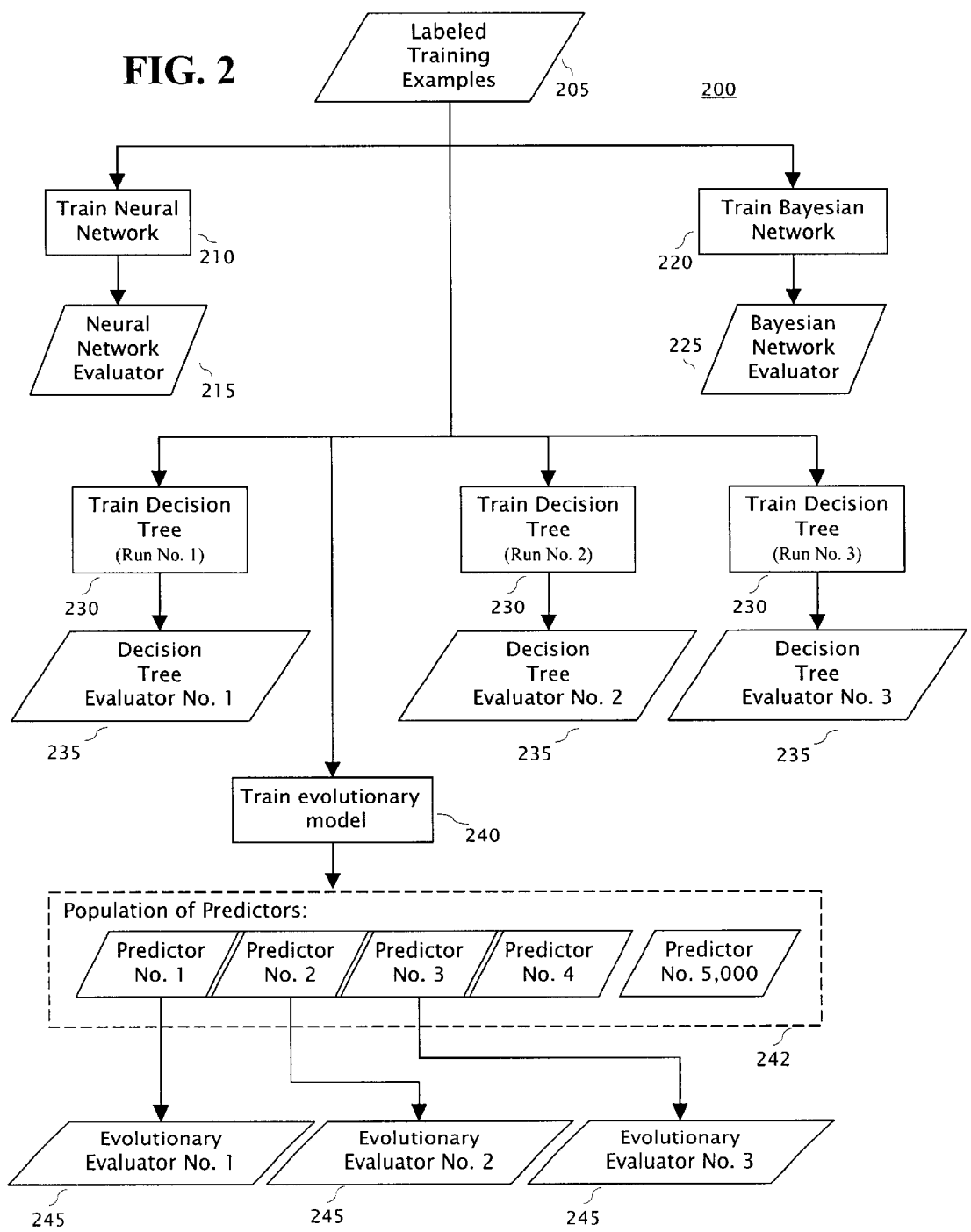
FIG. 2 shows an example of how, in some embodiments of the invention, machine learning models can be trained, thereby producing evaluators.

FIG. 2 shows an example of how, in some embodiments of the invention, machine learning models can be trained, thereby producing evaluators. It also shows how, in some embodiments of the invention, evolutionary models can be trained to produce predictors, and a subset of the predictors selected to be evaluators.

Labeled training examples 205 is a collection of the input data describing a number of instances of particular objects, in which the input data for each instance has been labeled with the correct or best alternative for that particular object. A variety of different machine learning models can be trained from labeled training examples 205, or perhaps from different subsets from or instances of labeled training examples 205.

In operation 210, labeled training examples 205 are provided to a neural network model, thus producing neural network evaluator 215. Neural networks and the process of learning or training them are well known in the art. For example, a bibliography of books and articles on neural networks may be found on pages 126 to 127 of Tom M. Mitchell's book *Machine Learning*, published by WCB McGraw-Hill (1997).

In operation 220, labeled training examples 205 are provided to a Bayesian network model, thus producing neural network evaluator 225. Bayesian networks, which are also known as belief networks, and the process of learning or training them, are well known in the art. For example, a bibliography of books and articles on Bayesian networks may be found on pages 199 to 200 of the Tom M. Mitchell book cited above.

In operations 230, labeled training examples 205 are provided to a decision tree model in three different runs. Decision tree learning may be non-deterministic, in which case the three runs shown in process 200 produce three different instances of decision tree evaluators 235. While FIG. 2 shows three runs yielding three evaluators, in practice there may be some machine decision problems that can be advantageously approached by producing dozens or hundreds of decision tree evaluators.

In operation 240, labeled training examples 205 are provided to an evolutionary model, thus producing a population of predictors 242. As shown in FIG. 2, population of predictors 242 contains 5000 predictors, but in practice this number could be larger or considerably smaller. Population of predictors 242 is sorted by some criterion such as accuracy, reliability or confidence to produce predictor number 1, number 2, and so on. While FIG. 2 shows the best three predictors being selected as evolutionary evaluators 245, in some embodiments of the invention the set of predictors chosen as evaluators might be, for example, the fifty best of the population.

Evolutionary models, which are also known as population based models, genetic algorithms or genetic programming, and the process of learning or training them, are well known in the art. For example, a bibliography of books and articles on such evolutionary models may be found on pages 270 to 273 of the Tom M. Mitchell book identified above.

While FIG. 2 relates to evaluators based on machine learning, an evaluator may be any machine implemented function that accepts input data describing a particular instance of an object and that ranks, based on the input data, each of the set of alternatives. One skilled in the arts of computer science and artificial intelligence will recognize how, instead of or addition to, evaluators based on machine learning, rule based systems, expert systems, hand crafted programs, parameterized models or other techniques, may be employed as evaluators in the invention.

There are some automatic ways of machine learning of the models used in a machine decision problem. For example, clustering is a process that determines what set of alternatives are used and what input data is relevant. There are some machine implemented solutions to the clustering program, which may be used in some embodiments of the invention. Nevertheless, other embodiments of the invention rely on hand design of the input data and sets of alternatives.

Many evaluators are set up to simply produce a score indicating how well the data for a particular instance of an object matches a particular alternative. The score is based on the input data and the alternative and may represent a level of confidence that the alternative is the correct one, an estimate of the likelihood that the alternative is correct, a estimate of the revenue that can be expected if the selected alternative is acted on, among other possibilities.

Figure 3:
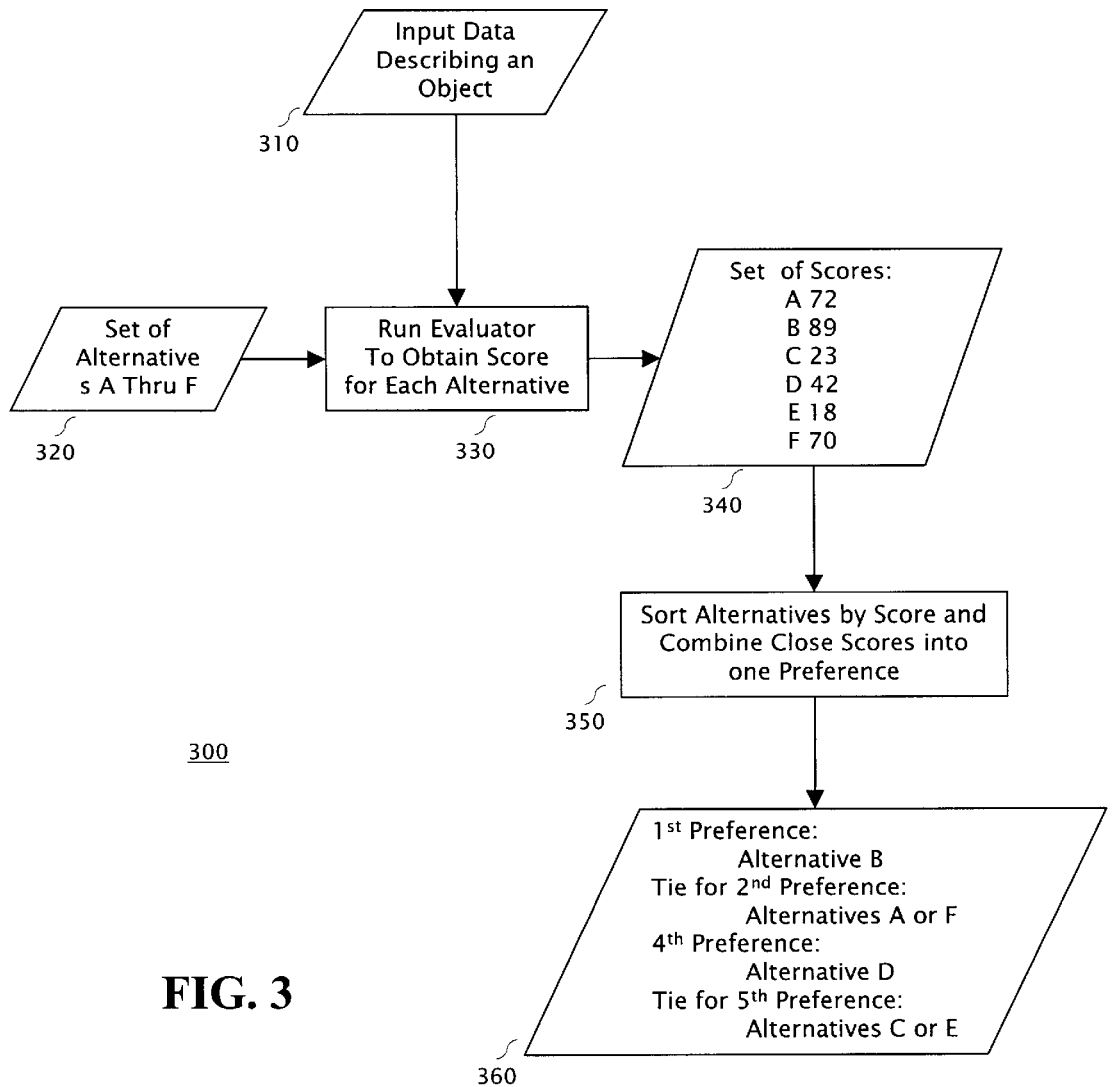
FIG. 3 shows an example of how, in some embodiments of the invention, an evaluator that decides a score of a particular alternative for a particular object can be used to rank the set of alternatives with respect to that object.

FIG. 3 shows an example 300 of how, in some embodiments of the invention, such a score-based evaluator may be used to rank the set of alternatives with respect to that object. In some embodiments of the invention, it may be advantageous to consider two or more alternatives equivalent if their scores are sufficiently close.

In operation 330, input data 310, which describes a particular instance of an object, and the definitions of the set of alternatives A thru F 320 are provided to each evaluator. For each object, set of scores 340 is obtained. Set of scores 340 indicate how well each object and each alternative match.

In operation 350, the alternatives are sorted by their score and are grouped into preferences.

In some embodiments of the invention, the groupings are based on a minimum threshold difference between scores. That is, as shown in operation 360, if the difference between the scores of two objects is less than the threshold, then the alternatives are considered a tie and are put into the same preference ranking. In the example of FIG. 3, alternatives A and F, which score respectively 72 and 70, are considered to be tied within the second preference rank. Also, the fifth preference rank includes alternatives C and E, which respectively score 23 and 18.

Not all evaluators follow the model of FIG. 3. Bayesian networks, for example, can be implemented so to take the input data for an object and provide a list of probability estimates for all alternatives at once.

FIGS. 4(a) thru 4(c) show an example machine decision problem in which five evaluators rank alternative types of restaurants with respect to a person visiting a web site. The types of restaurants used in this example problem are: Burger, Lobster, Pizza, Salad, Sushi or Tacos. The goal of this example problem is to select the type of restaurant for which an advertisement is most likely to be effective with this person. FIGS. 4(a) thru 4(c) show how an overall or aggregate decision is reached, according to some embodiments of the invention, as to which single restaurant ad to display to this person.

FIG. 4(a) shows the example intermediate ranking of each of the five evaluators, each ranking the six alternative restaurant types. Table 410 also shows the initial series of preferences, that is, the rows of the column labeled "Evaluator Number 1" are the initial series of preferences that correspond to the first evaluator.

Table 413 shows the rankings of table 410 expressed as scores in pairwise contests for each pair. Each pairwise contest is judged by all of the evaluators and the majority rules. For example, the score of "4–1" in the Sushi column of the Tacos row indicates that Sushi beats Tacos by a margin of 4 to 1. Specifically, four evaluators (numbers 1, 3, 4 and 5) agree that Sushi is a better choice than Tacos, while only one evaluator ranked Tacos above Sushi.

Graph 415 shows the rankings of table 410 or 413 expressed as a Condorcet or pairwise dominance graph. Each alternative is represented as a node in graph 415. An arc goes from a dominant node (that is, the arc end with no arrow point) to a dominated node (that is, the arc end with an arrow point) when the dominant node is the Condorcet winner over the dominated node. Graph 415 shows that Tacos loses to every other alternative and that Lobster loses to every alternative but Tacos. Thus, these two alternatives can be pruned from each series of preferences and eliminated from further consideration.

Group 417 in graph 415 contains the other four alternatives, and it can be seen that there is no Condorcet winner or loser among those four alternatives. That is, each of those four alternatives win over some and lose over others. Thus, a technique other than Condorcet pruning must be used to eliminate the weakest of those four alternatives.

Group 417 is a Condorcet equivalence group. An alternative is a member of a Condorcet equivalence group if it ties a member of that group or if it beats one member but loses to another. Pictorially, if arrows are drawn between alternatives based on pairwise preference, then a Condorcet equivalence group is the maximal set that has cycles in it. A Condorcet dominance graph is a sequence (that is, a total ordering) of Condorcet equivalence groups. Any alternative in a group will beat any alternative in any subsequent group. Nevertheless, in a particular group, there is no alternative that beats all of the others.

FIG. 4(b) shows the results of applying a preferential voting technique to the series of preferences of table 410. Specifically, the Condorcet losers (that is, Lobster and Tacos) are removed from table 410 and the remaining alternatives are adjusted upward in the rankings as appropriate. This produces table 420.

FIG. 4(b) shows the results of pruning FIG. 4(a) to the Condorcet dominant group, that is, computing the Condorcet dominance graph and removing all alternatives that are not in the first group. Any alternatives that are in subsequent or lesser groups would lose in pairwise contests to all alternatives in the first group. Thus, they are not candidates for the aggregate decision and can be ignored.

Graph 425 shows the rankings of table 420 expressed as a Condorcet dominance graph. Graph 425 may be constructed either from analyzing table 420, as table 410 was analyzed above, or by removing the nodes representing the two eliminated alternatives from graph 415.

FIG. 4(c) shows the results of next applying a different preferential voting technique to the series of preferences of table 420. Specifically, because no alternative has a majority of the first preference votes, the alternative that has the fewest first place preferences (i.e. Burger) is removed, thus resulting in table 430.

Graph 435 shows the rankings of table 430 expressed as a Condorcet pairwise dominance graph. An examination of graph 435 shows that "Pizza" is the aggregate decision, according to one embodiment of the invention, for this specific example. That is, both "Salad" and "Sushi" lose pairwise contests to "Pizza" and thus would be removed in another round of Condorcet pruning.

In another embodiment of the invention, neither Condorcet winners nor Condorcet pruning would occur to the series of preferences of FIG. 4(c). Rather, another round of selecting the alternative with the fewest first place preferences would occur. In this embodiment, "Pizza" would be eliminated on the next round, because it has only one first-place vote, versus two for each of the other alternatives. In this embodiment, "Salad" would win.

Note that it is a strength, not a weakness, of the invention that various embodiments use variations in selection techniques and pruning techniques which may produce different results. Machine decision problems are complex, and it may be desirable to tune the exact implementation details to the specific details of the problem being solved or to the specific set of evaluators being used. Also, some machine decision problems simply do not have a single optimal solution, in which case the aggregate decisions produced should include the better solutions.

FIGS. 5(a) and 5(b) shows how other embodiments of the invention would operate on the same example problem as in FIGS. 4(a) thru 4(c). Specifically, instead of removing the alternative with the least first preference votes, the alternative with the most last preference votes is eliminated. Table 510 shows the results of removing Sushi and re-grouping the preferences of table 420 of FIG. 4(b). As described above, table 420 shows the preferences of the example problem after the Condorcet losers are removed. Sushi is removed, because it has the most last preference votes. Graph 515 shows the preferences of table 510 expressed as a Condorcet dominance graph. The remaining alternatives still form a single equivalence group, so a further round of most last preference elimination is needed.

FIG. 5(b) shows the results of a second application of the same technique. Specifically, the next alternative with the most last place preferences (that is, Salad) is removed. Here Salad and Pizza each have two last-place votes, but Salad is removed because Pizza beats Salad 3 to 2 in a pairwise contest.

Table 520 shows the preferences after Salad is removed and the preferences are re-grouped. Graph 525 shows the preferences of table 520 expressed as a Condorcet dominance graph. Of the two alternatives remaining, "Burger" has an absolute majority. Thus, "Burger" is selected as the aggregate decision when this embodiment of the invention is applied to the example problem.

Figure 6:
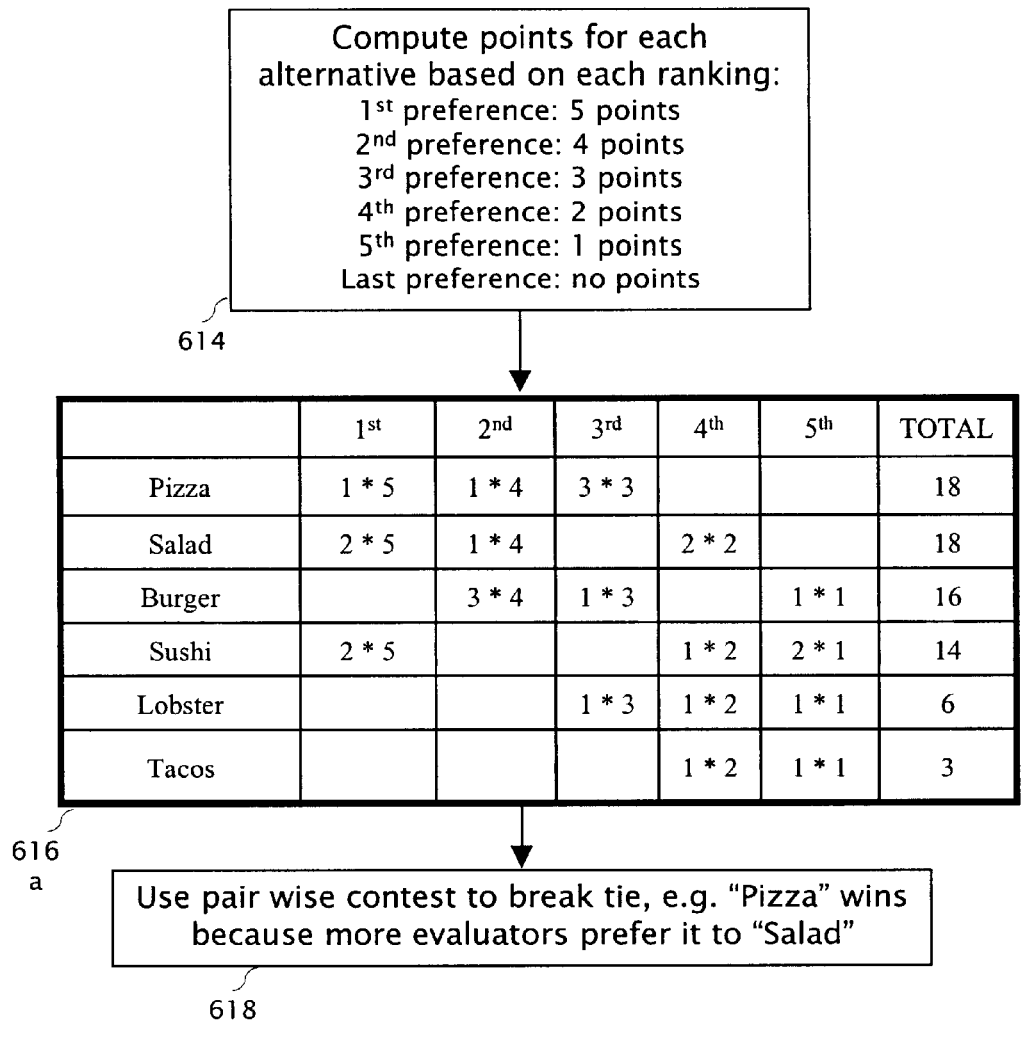
FIGS. 6(a) and 6(b) shows how yet other embodiments of the invention would operate on the same example problem shown in FIG. 4.
Figure 6:
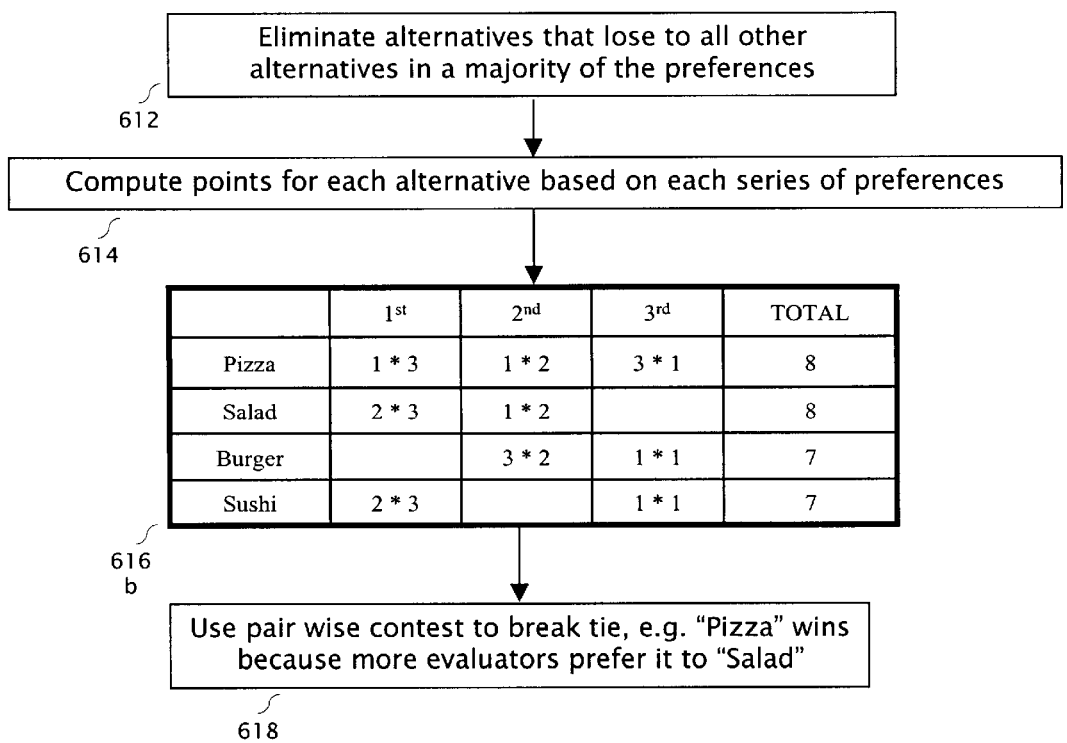

FIGS. 6(a) and 6(b) show how the same example problem is processed by some embodiments of the invention. These figures show how yet another preferential voting technique can be used, specifically one that computes points based on how well each alternative is preferred in each series. Such techniques may be thought of as computing the average ranking that each alternative receives across the different intermediate rankings from the different evaluators.

FIG. 6(a) applies point count elimination to the preferences of table 410 in FIG. 4(a), which are the intermediate rankings obtained from the evaluators. FIG. 6(b) applies the same point count technique to the preferences of FIG. 4(b), which are the results of applying Condorcet pruning to the same intermediate rankings.

In step 614 of FIG. 6(a), points are computed for each of the alternatives based on the intermediate rankings of table 410. The point values used can be thought of as the number of times that one alternative is preferred to any other by each evaluator. Alternatively, the total points can be thought of as the sum of the number of alternatives listed below the alternative on any series of preferences or, equivalently, as giving N minus 1 points to the first preference, N minus 2 points to the second, and so on (for a problem with N alternatives).

The resulting total points for each alternative are shown in table 616(a), where Pizza and Salad tie with 18 total points. Various embodiments of the invention resolve such ties in various ways. As shown in step 618, ties may be broken by considering that Pizza beats Salad in a pairwise contest, thus Pizza is the aggregate decision.

FIG. 6(b) shows another example of the point count/average preference voting technique. In step 612, the pairwise losers are eliminated, the results of which are shown in table 420. In step 614, points are again computed for each of the remaining alternatives. The point results are shown in table 616(b). Again, the tie is resolved in step 618, and Pizza is the aggregate decision.

In other embodiments of the invention, the alternatives or alternative receiving the lowest point total or average preference may be eliminated from further consideration.

FIGS. 7(a) thru 7(e) show how another embodiment of the invention solve the same example machine decision problem. Except for taking weights into account, the process is as shown above with respect to FIGS. 4(a) to 4(c). FIG. 7(a) shows the intermediate ranking and weight of each evaluator. FIG. 7(b) shows the preferences after eliminating the pairwise loser (Tacos). FIG. 7(c) shows the preferences after next removing the alternative having the fewest weighted first place preferences (Lobster). FIG. 7(d) shows the preferences after next removing the alternative that now has the fewest weighted first place preferences (Pizza). And finally, FIG. 7(e) shows the preferences re-grouped after next removing the alternative that now has the fewest weighted first place preferences (Salad).

FIG. 7(a) shows the intermedite ranking and weight of each evaluator. As shown in table 710, this embodiment of the invention includes four weighted evaluators that select the restaurant ad to be shown to a person visiting a web site.

The weights applied to the intermediate decisions may include factors such as, among others: a measure of the relative accuracy of each evaluator; a measure of the confidence of the system designer in each evaluator; or a dynamic measure of how confident a particular evaluator is about the intermediate rankings generated for this particular object.

Simple integer weights can be thought of as replicating evaluators. That is, if an evaluator has a weight of K, for some integer K then this can be treated as if there were K identical evaluators. Nevertheless, some embodiments of the invention use weighting factors that are percentages or real numbers. Such weights are applied to the intermediate rankings by computing votes by multiplying the preferences of each intermediate ranking by its corresponding weight; for example, a weight of 0.82 corresponding to a particular evaluator means that each of its first preference choices receives 0.82 first preference votes.

Table 713 shows the rankings of table 710 expressed as scores in pairwise contests for each possible pairing, as judged by all of the evaluators according to their weights. Non-weighted rankings and preference sets based on an odd number of evaluators will not produce ties in pairwise contests, but three such ties appear in table 713, that is, Salad ties Sushi, Lobster ties Burger and Lobster ties Salad.

Graph 715 shows the rankings of tables 710 or 713 expressed as a Condorcet dominance graph. In this graph, the three ties are shown as undirected arcs, i.e. lines between the nodes without an arrow on either end of the line. Group 717 contains the Condorect winners. Thus, Cordorcet pruning removes the alternative not in group 717 (Tacos).

In FIG. 7(b), table 720 shows the preferences re-grouped as the result of removing the Condorcet loser (Tacos) from the rankings of FIG. 7(a). Graph 725 shows the preferences of table 720 expressed as a Condorcet dominance graph, which shows that Condorcet pruning would not remove any alternatives at this time.

FIG. 7(c) shows the preferences after being re-grouped for a second time. The re-grouping is based on the preferential voting technique in which the alternative having the fewest weighted first place votes (Lobster) is removed from the rankings of FIG. 7(b). Table 730 shows the re-grouped preferences. Graph 735 shows the preferences of table 730 expressed as a Condorcet pairwise dominance graph, which shows that Condorcet pruning would not remove any alternatives at this time.

FIG. 7(d) shows the preferences re-grouped for a third time, based on a second application of the same preferential voting technique. This time, the alternative having the fewest first place votes is Pizza, which is removed from the rankings of FIG. 7(c). Table 740 shows the re-grouped preferences. Graph 745 shows the rankings of table 740 expressed as a Condorcet pairwise dominance graph, which shows that Condorcet pruning would not remove any alternatives at this time.

FIG. 7(e) shows the preferences re-grouped for a fourth time, based on a third application of the same preferential voting technique. This time, the alternative having the fewest first place votes is Salad, which is removed from the preferences of FIG. 7(d). Table 750 shows the re-ranked preferences. Graph 755 shows the preferences of table 750 expressed as a Condorcet dominance graph, which shows that Sushi is the Condorcet winner. Sushi is also the majority winner of the preferences of table 750.

Figure 8:
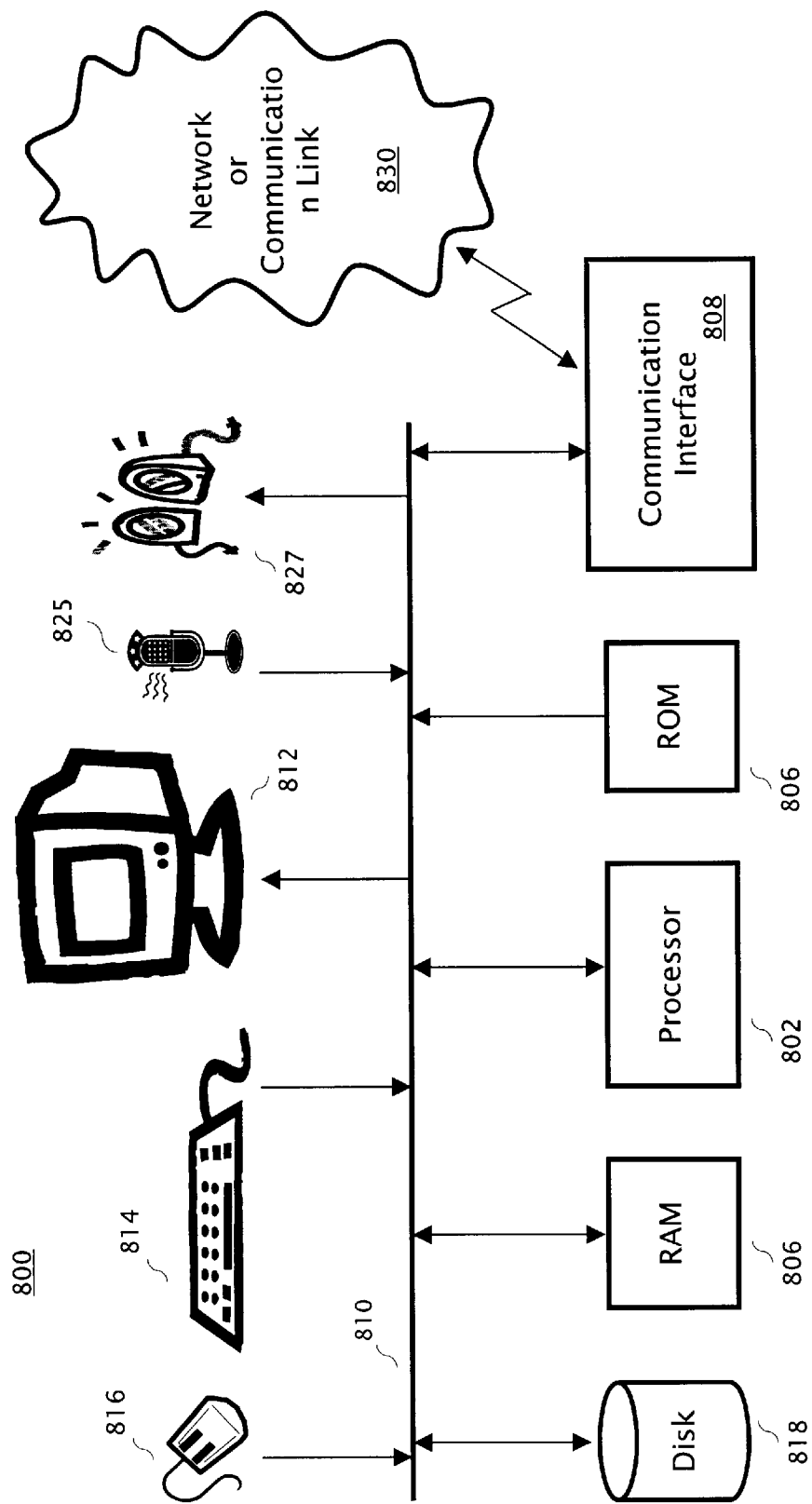
FIG. 8 shows the functional components and their interconnections within a computer system that may be used in accordance with, or to implement, some embodiments of the invention.

FIG. 8 is a block diagram of an example computer system that can be used in some embodiments of the invention. Computer system 800 is not limited to being a typical personal computer but it may be any type of computing device, including, for example, a server, portable computing device, or a personal digital assistant. Computer system 800 and variants thereon may be employed in the invention to implement or perform the methods and techniques described herein.

Computer system 800 comprises one or more buses 810 configured to communicate information including addresses, op codes and data. The computer system also comprises one or more processors 802 configured to process information and data according to instructions and other data. The processor may be a central processing unit, a microprocessor, an embedded processor, or a special purpose processor, for example.

The computer system may optionally include RAM 804, that is, one or more volatile memory units or other devices or circuits configured to store information, data and instructions. RAM 804 may be random access memory (RAM), static RAM, or dynamic RAM, as examples. RAM 804 is coupled to bus 810.

Computer system 800 may optionally include ROM 806, that is, one or more non-volatile memory units or other devices or circuits configured to store static information and instructions. ROM 806 may include among other options, such as read only memory (ROM), programmable ROM, flash memory, electrically programmable ROM (EPROM), or erasable electrically programmable ROM (EEPROM). ROM 806 is coupled with bus 810.

The computer system may optionally include communication interface 808, which may be one or more devices or circuits configured to interface with another electronic device via network or communication link 830. Communication interface 808 is coupled to bus 810 and may be based on wired communication technology, wireless communication technology, or both. Communication interface 808 may be a serial communication port, a Universal Serial Bus (USB), an Ethernet adapter, an IEEE 1394 bus interface, a parallel port, a small computer system interface (SCSI) bus interface, an infrared (IR) communication port, a Bluetooth wireless communication adapter, a broadband connection, or a connection to the Internet, among other options.

The computer system may optionally include keyboard 814, that is, one or more alphanumeric input devices configured to communicate information and command selections from a user. Keyboard 814 may, for example, have alphabetic, numeric, function and control keys, buttons, selectors or touch-sensitive screens or any combination thereof. The keyboard is coupled to bus 810.

The computer system may also include mouse 816, that is, one or more cursor control, indicating, selecting or pointing devices configured to communicate analog, quantitative or selection user input information and command selections to processor 802. The mouse element may be a mouse, a track ball, a track pad, an optical tracking device, a joystick, a game controller, a touch screen, or a glove, for example. The mouse is coupled to bus 810. Alternatively or additionally, the functions of mouse 816 may be directed or activated via input from keyboard 814 using special keys, key sequences or commands.

Computer system 800 may optionally include one or more devices configured to sense, process, generate and recognize voice commands, responses or other words. Voice recognition may replace or augment the functions of keyboard 814, mouse 816, or both. Such devices may include, among others, microphone 825 or speaker 827, which may also be used for audio capture and reproduction of, for example, speech, singing and music.

The computer system may optionally include disk 818, that is, one or more devices or circuits configured to store sizable amounts of information, data or instructions. Disk 818 may, for example, be a mass storage device, a magnetic disk, an optical disk, a compact disk (CD), a writeable CD, a digital versatile disk (DVD), a hard disk, a floppy disk, a flash memory or a memory stick. Disk 818 is coupled to bus 810.

Computer system 800 may optionally include display 812, that is, one or more devices or circuits configured to display pictures, video, text or graphics. Display 812 may be, among other options, a cathode ray tube (CRT), a flat panel display, a liquid crystal display (LCD), a field emission display (FED), or a heads up display in a vehicle. Display 812 is coupled to bus 810.

Certain operations, processes and steps are discussed herein that may be realized, in some embodiments of the invention, as a series of instructions, including among other options: codes, commands, program operation codes (op codes), pseudo codes (p-codes), firmware or software. These instructions may be executed by various components of the computer system, including but not limited to, processor 802, programmable controllers within communications interface 808, and programmable controllers within disk 818.

When executed, the instructions control computer system 800 such that it performs specific actions and exhibits specific behavior as described herein. Representations of these instructions may reside within, or be made available via, various media. Such media may include, among others, memory devices, floppy disks, CDs, computer readable media, or information streams made available via communication interface 808.

Accordingly, the invention as described herein provides a method and system which enables computing of an overall or aggregate decision, based on intermediate decisions as to which alternative or alternatives best apply to an object.

The foregoing drawing figures and descriptions are not intended to be exhaustive or to limit the invention to the forms disclosed. Rather, they are presented for purposes of illustrating, teaching and aiding in the comprehension of the invention. The invention may be practiced without the specific details described herein. Numerous selections among alternatives, changes in form, and improvements can be made without departing from the principles, intent or essence of the invention. The invention can be modified or varied in light of the teachings herein, the techniques known to those skilled in the art, and advances in the art yet to be made.

The scope of the invention for which a patent is sought is set forth by the following claims and their legal equivalents.

What is claimed is:

1. A method of computing an aggregate decision about an object, the method comprising:
   obtaining at least two intermediate rankings, each of which ranks at least three alternatives with respect to the object;
   initializing at least two series of preferences, wherein each series corresponds to one of the intermediate rankings, each series is ordered from a first preference to a last preference, each series initially groups each alternative into one of the preferences selected based on the corresponding intermediate ranking, and each preference includes at least one of the alternatives;
   selecting, based on the preferences, at least one of the alternatives as a weak alternative;
   removing at least one weak alternative from each series; then
   re-grouping each series into preferences based on the intermediate ranking corresponding to the series;
   deciding, when each series contains less than a first threshold number of the alternatives, that the aggregate decision includes the alternatives remaining in the series; and
   repeating selecting, removing, re-grouping, and deciding until an aggregate decision is made.

2. The method of claim 1, and further comprising deciding at least one of the intermediate rankings based on a technique selected from at least one of a machine learning technique, a decision tree, a belief network, a neural network, a static model, a program, and an evolutionary training method.

3. The method of claim 2, and further comprising deciding at least two of the intermediate rankings based on at least two different techniques each selected from at least one of a machine learning technique, a decision tree, a belief network, a neural network, a static model, a program, and an evolutionary training method.

4. The method of claim 1, wherein the alternatives include classifications of the object and the aggregate decision classifies the object.

5. The method of claim 1, wherein the alternatives include a set of future behaviors of the object and the aggregate decision predicts a likely one of the future behaviors.

6. The method of claim 1, wherein the alternatives include options and the aggregate decision selects at least one of the options based on the object.

7. The method of claim 1, wherein each intermediate ranking is represented in the selecting by at least two preferences.

8. The method of claim 1, wherein the selection of the weak alternative includes identifying which alternatives are preferred over other alternatives, and in every series every other alternative is preferred over the weak alternative.

9. The method of claim 1, wherein the selection of the weak alternative includes identifying which alternatives are preferred over other alternatives, and at least a first percentage of the alternatives are preferred over the weak alternative in at least a second percentage of the series.

10. The method of claim 1, wherein the selection of the weak alternative includes identifying which alternatives are in the first preference of each series, and no other alternative is in the first preference in fewer series than the weak alternative.

11. The method of claim 1, wherein the selection of the weak alternative includes identifying which alternatives are in a set of first preferences within each series, and there is less than a selected percentage of the alternatives that are omitted from the set of first preferences more than the weak alternative is omitted from the set of first preferences.

12. The method of claim 1, wherein the selection of the weak alternative includes identifying which alternatives are in the last preference of each series, and no other alternative is in the last preference in more series than the weak alternative.

13. The method of claim 1, wherein the selection of the weak alternative includes identifying which alternatives are in a set of last preferences within each series, and less than a selected percentage of the alternatives are in the set of last preferences more than the weak alternative is in the set of last preferences.

14. The method of claim 1, wherein the selection of the weak alternative includes giving to each alternative a number of points based on each preference in each series, the number of points decreasing for lower preferences, and a total of the points received by the weak alternative is no more than a total of the points received by any other alternative.

15. The method of claim 1, wherein the selection of the weak alternative includes calculating an average preference for each alternative, and the average preference of less than a selected percentage of the alternatives is higher than the average preference of the weak alternative.

16. The method of claim 1, wherein the selection of the weak alternative includes identifying which alternatives are in a set of first preferences within each series, and less than a selected percentage of the series have the weak alternative in the set of first preferences.

17. The method of claim 1, wherein each intermediate ranking has a weighting factor and the selection of the weak alternative applies to each preference the weighting factor of the intermediate ranking corresponding to the preference.

18. The method of claim 1, and further comprising selecting a particular alternative to be included in the aggregate decision and removing the particular alternative from each series.

19. The method of claim 18, wherein the particular alternative is selected from at least one of:
   one of the alternatives that is in the first preference of at least a second threshold number of the series;
   one of the alternatives that is preferred over every other alternative in every series; and
   one of the alternatives that is preferred over at least a first percentage of the alternatives in at least a second percentage of the series.

20. The method of claim 1, wherein the first threshold number is selected from a predetermined number, a predetermined percentage of the alternatives, and a number that is adjusted during the operation of the method.

21. A computer readable media containing instructions that, when the instructions are read and executed by a system, control a process comprising:
   obtaining at least two intermediate rankings, each of which ranks at least three alternatives with respect to the object;
   initializing least two series of preferences, wherein each series corresponds to one of the intermediate rankings, each series is ordered from a first preference to a last preference, each series initially groups each alternative into one of the preferences selected based on the corresponding intermediate ranking, and each preference includes at least one of the alternatives;
   selecting, based on the preferences, at least one of the alternatives as a weak alternative;
   removing at least one weak alternative from each series; then
   re-grouping each series into preferences based on the intermediate ranking corresponding to the series;
   deciding, when each series contains less than a first threshold number of the alternatives, that the aggregate decision includes the alternatives remaining in the series; and
   repeating selecting, removing, re-grouping, and deciding until an aggregate decision is made.

22. The computer readable media of claim 21, wherein the process further comprises deciding at least two of the intermediate rankings based on at least two different techniques each selected from at least one of a machine learning technique, a decision tree, a belief network, a neural network, a static model, a program, and an evolutionary training method.

23. The computer readable media of claim 21, wherein the aggregate decision is selected from at least one of a decision that classifies the object, a decision that predicts a likely future behavior of the object and a decision that selects among a set of options based on the object.

24. The computer readable media of claim 21, wherein the selection of the weak alternative includes identifying which alternatives are preferred over other alternatives, and at least a first percentage of the alternatives are preferred over the weak alternative in at least a second percentage of the series.

25. The computer readable media of claim 21, wherein the selection of the weak alternative includes identifying which alternatives are in a set of first preferences within each series, and there is less than a selected percentage of the alternatives that are omitted from the set of first preferences more than the weak alternative is omitted from the set of first preferences.

26. The computer readable media of claim 21, wherein the selection of the weak alternative includes identifying which alternatives are in a set of last preferences within each series, and less than a selected percentage of the alternatives are in the set of last preferences more than the weak alternative is in the set of last preferences.

27. The computer readable media of claim 21, wherein the selection of the weak alternative includes calculating an average preference for each alternative, and the average preference of no more than a selected percentage of the alternatives is higher than the average preference of the weak alternative.

28. The computer readable media of claim 21, wherein the selection of the weak alternative identifying which alternatives are in a set of first preferences within every series, and less than a selected percentage of the series have the weak alternative in the set of first preferences.

29. An apparatus configured to compute an aggregate decision about an object, the apparatus comprising:
   an interface configured to obtain at least two intermediate rankings, each of which ranks at least three alternatives with respect to the object;
   a processor configured to initialize at least two series of preferences, each series corresponding to one of the intermediate rankings, each series being ordered from a first preference to a last preference, each series initially grouping each alternative into one of the preferences selected based on the corresponding intermediate ranking, and each preference including at least one of the alternatives;
   wherein the processor is further configured to select, based on the preferences, at least one of the alternatives as a weak alternative, to remove the weak alternative from each series, to accordingly re-group each series into preferences based on the intermediate ranking corresponding to the series, to decide, when each series contains less than a threshold number of the alternatives, that the aggregate decision includes the alternatives remaining in the series, and to repeat the selecting, the removing, the re-grouping, and the deciding until an aggregate decision is made.

30. A means for computing an aggregate decision about an object, the means comprising:
   a means for obtaining at least two intermediate rankings, each of which ranks at least three alternatives with respect to the object;
   a means for initializing at least two series of preferences, each series corresponding to one of the intermediate rankings, each series being ordered from a first preference to a last preference, each series initially grouping each alternative into one of the preferences selected based on the corresponding intermediate ranking, and each preference including at least one of the alternatives;
   a means for selecting, based on the preferences, an alternative as a weak alternative;
   a means for removing the weak alternative from each of the series, and accordingly re-grouping each series into preferences based on the intermediate ranking corresponding to the series;
   a means for deciding, when each series contains less than a threshold number of the alternatives, that the aggregate decision includes the alternatives remaining in the series; and
   a means for repeating the selecting, the removing, the re-grouping, and the deciding until an aggregate decision is made.

* * * * *